United States Patent [19]

Carey

[11] 4,299,037

[45] Nov. 10, 1981

[54] BOOT APPLIANCE FOR IMPROVED TRACTION AND WEAR PROTECTION

[76] Inventor: Michael J. Carey, 4045 Third Ave., San Diego, Calif. 92103

[21] Appl. No.: 111,393

[22] Filed: Jan. 11, 1980

[51] Int. Cl.³ .......................... A43B 3/10; A43C 15/00
[52] U.S. Cl. .......................................... 36/7.6; 36/62
[58] Field of Search ...................... 36/7.5, 7.6, 7.7, 62, 36/135

[56] References Cited

U.S. PATENT DOCUMENTS

| 2,758,396 | 8/1956 | Edwardes | 36/67 D |
| 3,076,273 | 2/1963 | Wyllie | 36/7.7 |
| 3,313,047 | 4/1967 | Svien | 36/7.3 |
| 3,609,888 | 10/1971 | Rickman | 36/7.5 |
| 3,643,352 | 2/1972 | Adair | 36/7.3 |
| 3,965,586 | 6/1976 | Roosli | 36/7.3 |

Primary Examiner—Patrick D. Lawson
Attorney, Agent, or Firm—John L. Haller

[57] ABSTRACT

A boot appliance for improved traction for attachment to the sole of a boot includes a toe portion, a heel portion and a resilient middle portion for stretchably connecting the toe and heel portions. Both the toe and heel portions include stud tread designs on the bottom surfaces whereby to provide improved traction, cushion and wear prevention. The toe and heel portions also include toe and heel restraining straps, respectfully, for releaseably connecting the boot appliance for improved traction to the sole and heel of a boot.

11 Claims, 8 Drawing Figures

BOOT APPLIANCE FOR IMPROVED TRACTION AND WEAR PROTECTION

BACKGROUND OF THE INVENTION

1. Field of the Invention

This invention relates to boot or shoe appliance which, when properly attached to the sole of a boot or shoe, helps prevent the wearer from slipping on slippery surfaces. This invention is therefore particularly well suited for wet surfaces or surfaces which are covered with snow or ice. Further, this invention is well suited to those individuals who are required to stand for long periods of time on hard surfaces as the boot appliance for improved traction and wear prevention provides a cushioning support. Further, the boot appliance for improved traction and wear prevention, when properly attached to the sole of a shoe or boot, prevents wear and protects the sole of the boot or shoe.

2. Description of the Prior Art

In inclement weather, the possibility of injury to an individual is increased due to accidental slipping on a slippery surface such as wet pavement, snow or ice. A variety of shoe appliances have been developed to help prevent this danger. One type of such device requires physical connection to the shoe in a permanent fashion. Examples of such devices are shown in U.S. Pat. Nos. 2,061,962; 1,141,844; and 908,173. Another type of such device is applied to the shoe by fitting over a large portion of the shoe itself as a type of over-shoe. Examples of these devices are shown in U.S. Pat. Nos. 204,483; 1,841,701; and 3,616,522.

Those prior art devices which require physical connection to the sole permanently converts the shoe to the desired purposes. Accordingly, these devices are generally unsatisfactory as a temporary anti-skid shoe appliance.

Those devices which cover the shoe can be attached and detached, however, the procedures for putting the appliances on the shoes are generally difficult and cumbersome due to the tightness of fit of these devices. It is this tightness of fit which generally helps provide their waterproofing effect. However, this fit between the boot and the appliance necessarily results in the difficult attachment to the boot.

A particular problem associated with ski boots which are well suited to this device and which is not addressed in the prior art, is that simple walking in ski boots causes wear and tear on the toe and heel of the ski boot. This wearing down of the ski boot can cause improper operation of a ski binding which may result in injury to an individual. There are no products which are designed to prevent this form of deterioration to a ski boot or a boot generally.

SUMMARY OF THE INVENTION

A boot appliance for improved traction and wear prevention to help prevent inadvertant slipping and sliding and sole wear is provided by this invention. The boot appliance is easily attached to a boot or shoe by means of toe and heel straps which firmly grip the sole and heel of the boot or shoe.

The boot appliance also includes a bottom stud type tread which substantially increases traction on a slippery surface. Further the boot appliance offers resilience with a hard surface to provide cushioning for the user.

Further, the boot appliance for improved traction and wear prevention and particularly in its application with ski boots, prevents the wearing away and deterioration of the sole of the boot.

In view of the above it is the primary objective of this invention to overcome the problems of the prior art and to provide a skid-prevention boot appliance which is easily affixed to a boot or shoe.

It is also an object of this invention to provide a boot appliance which securely affixed and retained on and to the sole of the boot or shoe.

It is another object of this invention to provide a boot appliance which offers increased traction with a slippery surface.

Another object of this invention is to provide a boot appliance having a bottom tread design which offers increased traction on slippery surfaces.

It is another object of this invention to provide a boot appliance offering increased traction to the slippery surface and which is particularly suited to a ski boot and which can be easily collapsed and stored in a relatively small package.

An additional object of this invention is to provide a boot appliance which offers additional cushioning for the wearer on hard surfaces.

Another object of this invention is to provide a boot appliance which when applied to the sole of the boot, prevents the deterioration or wearing away of the boot's sole.

An additional object of this invention is to provide a boot appliance which offers increased traction, a cushioning effect and wear prevention.

BRIEF DESCRIPTION OF THE DRAWINGS

The following is a brief description of the accompanying drawings.

DESCRIPTION OF THE PREFERRED EMBODIMENT

Figure 1:
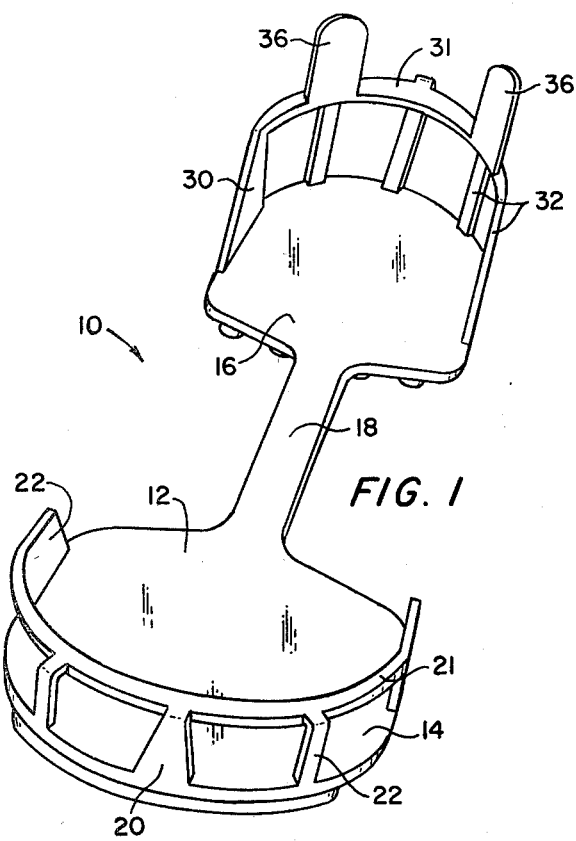
FIG. 1 is a top perspective view of the boot appliance for improved traction and wear prevention.

Referring to the drawings, FIG. 1 is a top perspective view of the boot appliance for improved traction and wear protection 10 showing its upward or internal face 12. The boot appliance 10 includes a front or toe portion 14 and a rear or heel portion 16. The toe portion 14 is connected to the heel portion 16 by a stretchably resilient middle portion 18. The middle portion 18 enables resilient separation between the toe portion 14 and the heel portion 16 of the boot appliance 10.

The middle portion 18 of the embodiment shown in FIG. 1, is generally a neckdowned resilient member which connects the toe portion 14 and the heel portion 16. This neckdown portion is slightly thinned at its center to provide additional resilience.

Extending upward from the toe portion 14 is a toe restraining strap 20. This toe strap 20 extends upward from the extreme forward edge of the toe portion 14 with five (5) toe connecting members 22 to a height which corresponds to the conventional thickess of the sole of a boot or shoe. At the upper edge of the toe strap 20, the toe connecting members bend inward and form a toe strap lip 21. With similar construction a heel restraining strap 30 extends upward from the extreme rearward edge of the heel portion 16 with five (5) heel connecting members 32 to a distance which corresponds to the conventional thickness of the heel of a boot or shoe. At the upper edge of the heel strap 30, the heel connecting members 32 bend inward to form a heel strap lip 31.

The boot appliance is particularly well suited for application with ski boots. In such an application, the height of the toe strap 20 corresponds to the thickness of the toe of the ski boot and correspondingly, the heel strap 30 corresponds to the thickness of the heel of the ski boot. The thickness of the soles and heels of ski boots are generally standardized to enable convenient interchangeability of ski boots and ski boot bindings.

At the inner edge of the heel restraining strap 30, two heel handles 36 are provided. The heel handles are symmetrically spaced off-center of the heel restraining strap 30 to aid in the attachment of the boot appliance to a boot.

Figure 3:
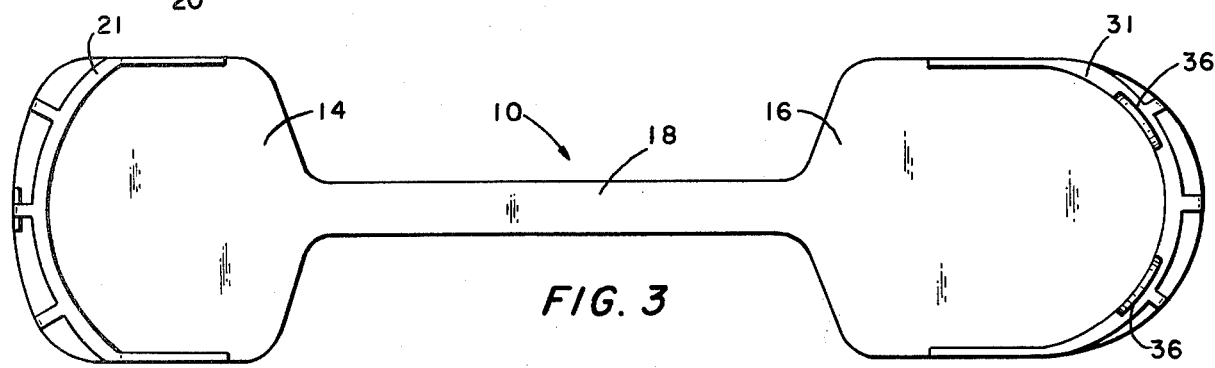
FIG. 3 is a top plan view thereof.

FIG. 3 is a top plan view of the boot appliance for improved traction and wear prevention 10 showing the toe portion 14 with the toe strap 20 and the toe strap lip 21. Additionally, the heel portion 16 is shown with the heel strap 30, the heel strip lip 31 and the heel handles 36.

Figure 2:
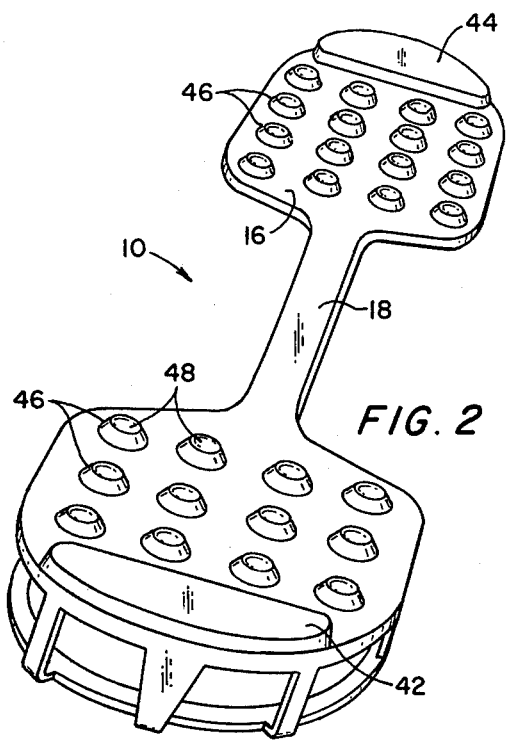
FIG. 2 is a bottom perspective view thereof.

FIG. 2 shows a bottom perspective view of the boot appliance for improved traction and wear prevention 10. The toe portion 14 and the toe strap 20 are shown from the underside as are the heel portion 16 and the neckdowned stretchably resilient middle portion 18.

FIG. 2 shows a basic tread design of the boot appliance for improved traction and wear prevention 10. This basic tread design includes a toe scuff tread 42 and a heel scuff tread 44. Both the toe portion 14 and the heel portion 16 include rectangular arays of cone shaped studs 46.

The cone shaped studs 46 have a slighly indented or concave bottom surface 48. This stud design offers additional traction on slippery surfaces such as wet surfaces, snow or ice.

Figure 4:
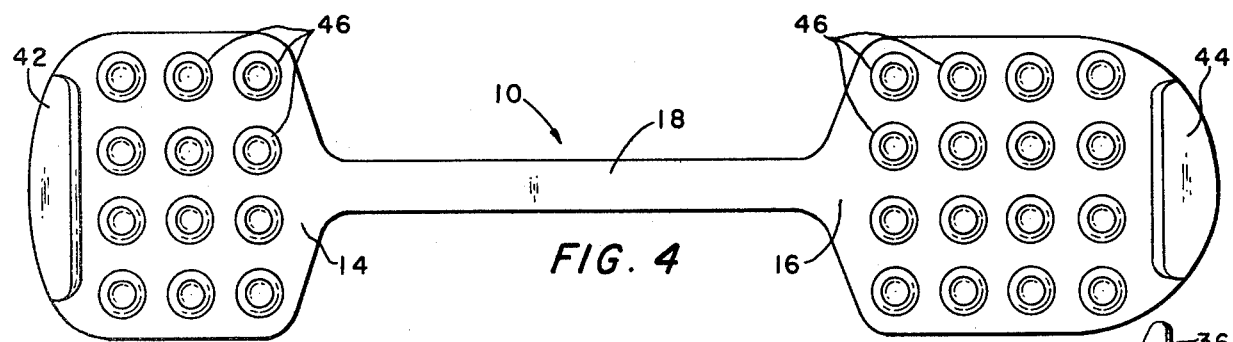
FIG. 4 is a bottom plan view thereof.

FIG. 4 is a bottom plan view of the boot appliance for improved traction and wear prevention 10 showing the toe portion 14, the heel portion 16 and the stretchably resilient middle portion 18. The toe portion 14 includes the toe scuff tread 42 and a rectangular (3×4) array of cone shaped studs 46. The heel portion 18 includes a heel scuff tread 44 in a rectangular (4×4) array of cone shaped studs 46.

Figure 5:
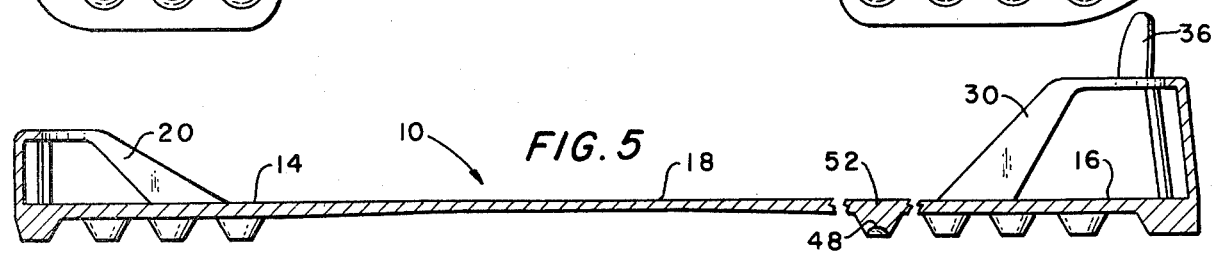
FIG. 5 is a sectional view of the boot appliance for improved traction and wear prevention taken at about 5—5 of FIG. 4.

FIG. 5 is a sectional view of the boot appliance for improved traction and wear prevention taken about 5—5 of FIG. 4. This sectional view plainly shows the center of the middle portion 18 having a thinned center area. This thinned center area facilitates the stretchable elongation and resilience of the boot appliance for improved traction and wear prevention 10. The heel strap 30 is higher than the toe strap 20 to accept the thicker shoe or boot heel.

Further, FIG. 5 shows a broken section of a single cone shaped stud at 52 with its concave bottom surface 48.

Figure 6:
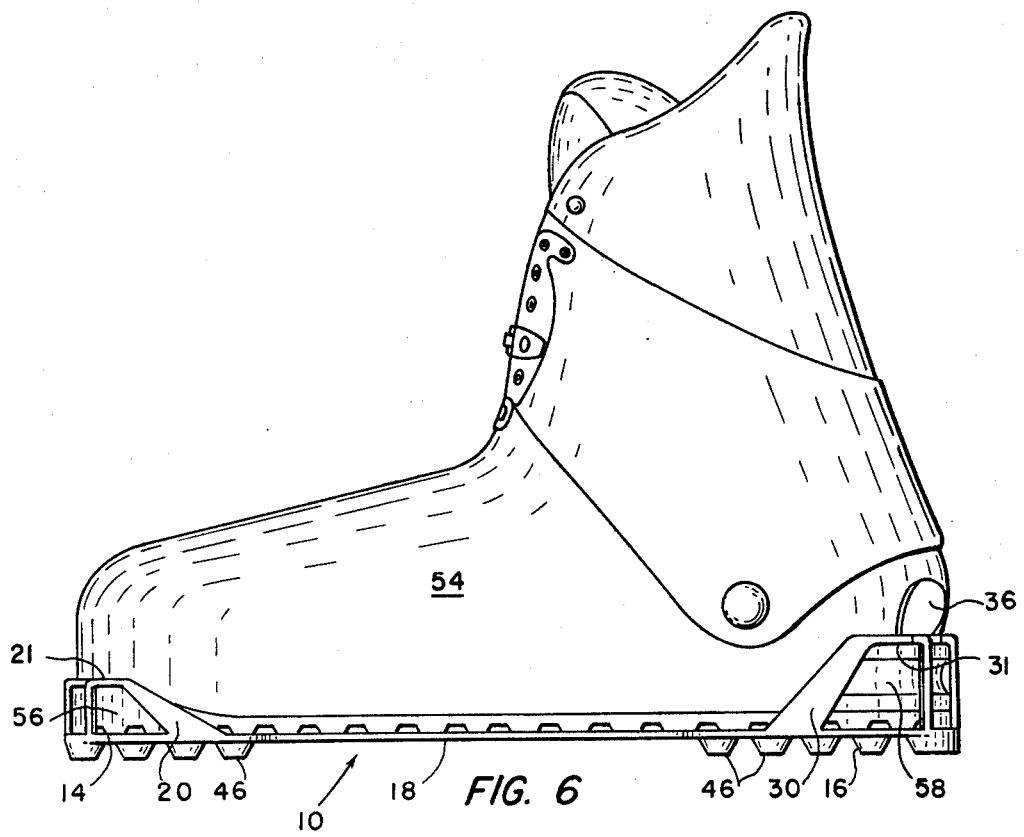
FIG. 6 is a elevational view of the boot appliance for improved traction and wear prevention showing a ski boot attached thereto.

FIG. 6 shows a boot appliance for improved traction and wear prevention 10 as it appears attached to a boot 54. The boot appliance 10 is attached to the boot by the toe strap 20 fitting over the extended sole of the toe of the boot 56 and the heel strap 30 fitting over the extended heel of the boot 58. The toe strap 20 and the heel strap 30 remained secured to the sole of the toe of the boot 56 and heel of the boot 58, respectively, by the resilient action of the middle portion 18 of the boot appliance 10.

The boot appliance for improved traction and wear prevention 10 is generally used in pairs. In a pair of boot appliances for improved traction and wear prevention, the individual devices are interchangeable as there are not left and right characteristics of the device.

Figure 7:
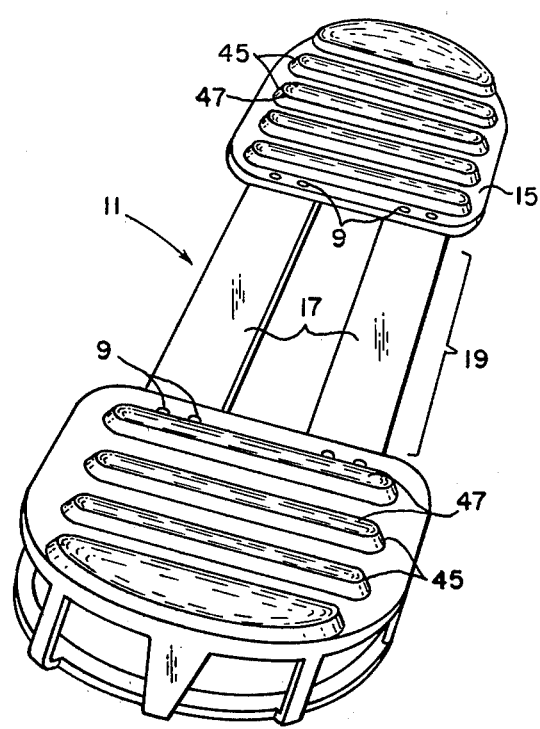
FIG. 7 is a bottom perspective view of a second embodiment of the boot appliance for improved traction and wear prevention.

FIG. 7 shows a second embodiment of the boot appliance for improved traction and wear prevention 11. In this second embodiment 11 the middle portion 19 is shown as a pair of longitudinally oriented neckdowned members 17. The operation of the middle portion 19 is to provide a structure which is stretchably resilient and connects the toe portion 13 to the heel portion 15. The embodiment shown in FIG. 7 has the two (2) neckdowned members 17 connected to the toe portion 13 and the heel portion 15 by rivets 9.

A tread design shown on the second embodiment of the boot appliance 11, is a series of transverse rib treads 45 having concave indentations 47 on the bottom surfaces thereof. Variations of the tread design are anticipated to include, by way of example, but not by way of limitation, longitudinal ribs, off set stud arrays, stud arrays having different stud shapes and other variations of tire type treads.

In the present embodiment of the boot appliance for improved traction 10, the device is constructed of a polyurethane. Variations of this material are anticipated to include other materials such as moldable rubber.

Figure 8:
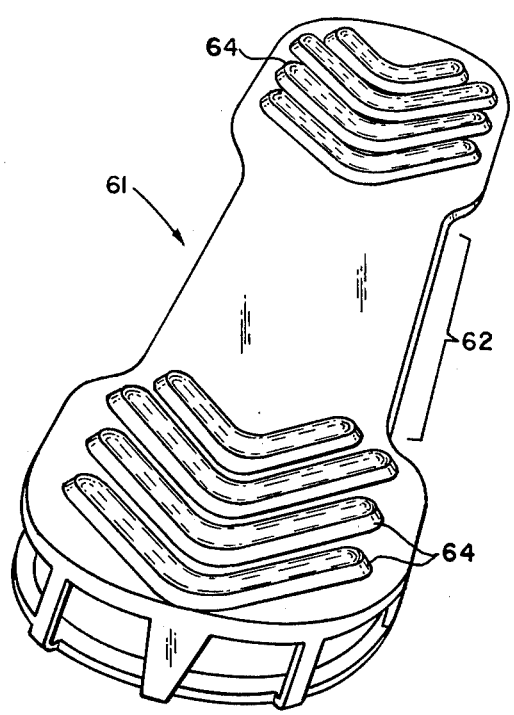
FIG. 8 is a bottom perspective view of a third embodiment of the boot appliance for improved traction and wear prevention.

FIG. 8 shows a third embodiment of the boot appliance for improved traction and wear prevention 61. In this third embodiment, the middle portion 62 is shown as a single broad strechable member which is slightly thinned at its center for improved resilience.

The tread design shown on the third embodiment 61 is a series of "V" shaped treads 64 which extend from its bottom surface.

The boot appliance for improved traction and wear prevention is attached to the boot 54 as shown in FIG. 6, by slipping the toe strap 20 of the toe portion 14 over the sole of the boot at the toe 56 then pulling the heel portion 16 backwards towards the heel of the boot 58 by the heel handles 36. The stretchably resilient middle portion 18 provides a necessary elongation such that the heel strap 30 can fit over the heel of the boot 58. When the heel strap 30 is properly placed over the heel of the boot 58, the heel handles 36 are released allowing the resilient action of the middle portion 18 to securely hold the toe strap 20 and the heel strap 30 to the sole at the toe of the boot 56 and heel of the boot 58, respectively.

It is understood that this description of the disclosed invention is done to fully comply with the requirements of 35 U.S.C. Sec. 112, and is not intended to limit the invention in any way. It is seen from the above description that varying forms of the boot appliance for improved traction and wear prevention can be easily developed, therefore, such varying forms are considered to be within the scope and essence of my invention.

What is claimed is:

1. A boot appliance for attachment to a boot comprising: a toe portion formed to a shape of the boot toe and a heel portion formed to the shape of the boot heel connected to said toe portion by a resiliently stretchable middle portion formed of a flat necked member, a tread design formed of a plurality of protrusions provided at the bottom side of the toe portion and at the bottom side of the heel portion, and both said toe portion and said heel portion having a separate restraining strap, said toe restraining strap includes a toe connecting means extending upward from the forward edge of the top surface of the toe portion then bending inward at the upper edge thereof and a toe strap lip connected to the inwardly bent toe connecting means, said heel restraining strap including a heel connecting means extending upward from the rearward edge of the top surface of the heel portion then bending inward at the upper edge thereof and a heel strap lip connected to the inwardly bent heel connecting means, said toe restraining strap and said heel restraining strap suitable for engagement with the sole of the toe and the heel, respectively, of the boot.

2. The boot appliance, as recited in claim 1, wherein said stretchable middle portion further includes a second flat necked member for connecting said toe portion to said heel portion.

3. The boot appliance, as recited in claim 1, wherein said flat necked member is formed of a broad panel having a thin section at the center thereof.

4. The boot appliance, as recited in claim 1, wherein said resiliently stretchable middle portion is symmetrically connected between the rearward edge of the toe portion and the forward edge of the heel portion; and is formed to be confined within the contour of the sole of the boot.

5. The boot appliance, as recited in claim 1, wherein said toe connecting means provided at the top side of the toe portion have a generally open structure and wherein said heel connecting means provided at the top side of the rearward edge of the heel portion have a generally an open structure.

6. A boot appliance, as recited in claim 1, wherein said plurality of protrusions includes a toe scuff tread at the extreme forward end of the toe portion and an array of cone shaped studs provided at said toe portion, said cone shaped studs having the bottom surfaces concave and a heel scuff tread at the extreme rear end of the heel portion and an array of cone shaped studs provided at said heel portion, said cone shaped studs having the bottom surfaces concave.

7. A boot appliance, as recited in claim 1, wherein said plurality of protrusions includes a series of transversely oriented ribbed treads having concave indenrations in the bottom surfaces thereof provided at said toe portion and a series of transversely oriented ribbed treads having concave indentations in the bottom surfaces thereof provided at said heel portion.

8. A boot appliance, as recited in claim 1, which is made out of a polyurethane.

9. A boot appliance, as recited in claim 1, wherein said plurality of protrusions includes a plurality of elongated projections configured in a series of nested rearward opening "V" shaped protrusions provided at said toe portion and, a plurality of elongated projections configured in a series of nested rearward opening "V" shaped protrusions provided at said heel portion.

10. A boot appliance, as recited in claim 1, wherein the toe connecting means includes a plurality of toe connecting members extending upward from the forward edge of the top surface of the toe portion then bending inward at the upper edge and wherein said heel connecting means includes a plurality of heel connecting members extending upwardly from the rearward edge of the top surface the heel portion then bending inward at the upper edge.

11. The boot appliance, as recited in claim 10, further comprising a heel handle connected to the heel strap lip to aid in the attachment of the boot appliance to the boot.

* * * * *